Figure 1:
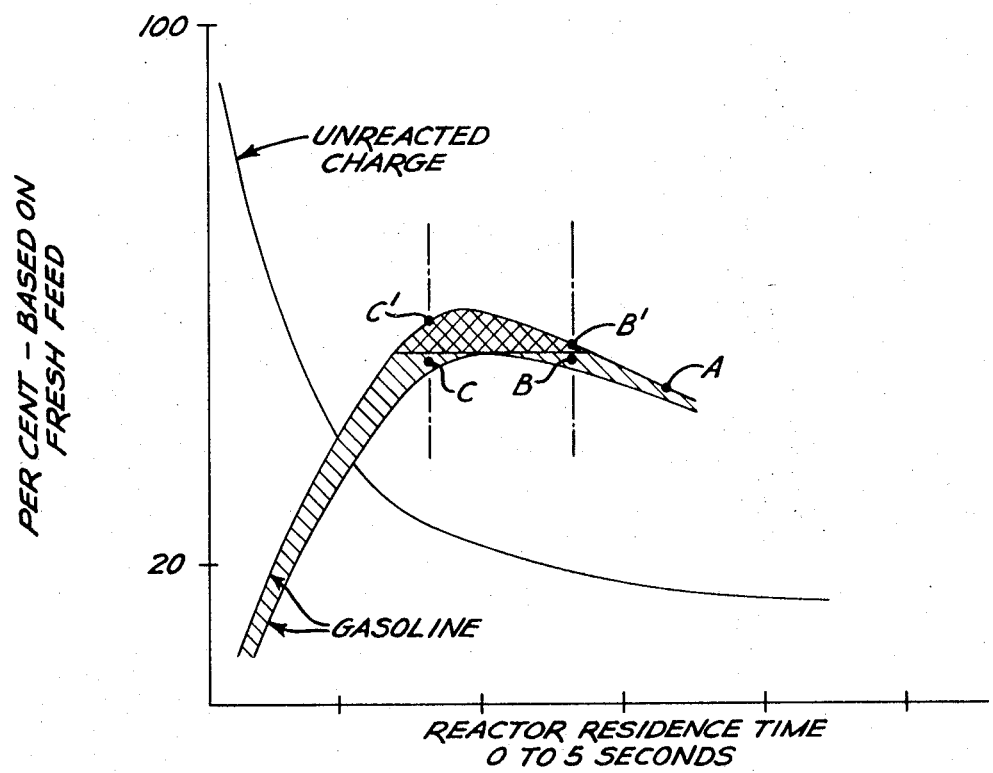

United States Patent

[11] 3,617,496

| [72] | Inventors | Millard C. Bryson<br>Conway, Pa.;<br>James R. Murphy, Huntington Station, N.Y. |
|---|---|---|
| [21] | Appl. No. | 836,382 |
| [22] | Filed | June 25, 1969 |
| [45] | Patented | Nov. 2, 1971 |
| [73] | Assignee | Gulf Research & Development Company<br>Pittsburgh, Pa. |

[54] FLUID CATALYTIC CRACKING PROCESS WITH A SEGREGATED FEED CHARGED TO SEPARATE REACTORS
11 Claims, 3 Drawing Figs.

[52] U.S. Cl. .................................................. 208/80,
23/288 S, 208/74, 208/120, 208/128, 208/130, 208/155, 208/160, 252/455 Z
[51] Int. Cl. .............................................. C01b 33/28,
C10g 11/18, C10g 11/20
[50] Field of Search............................................ 208/120, 130, 80; 23/288

[56] References Cited
UNITED STATES PATENTS

| 2,416,023 | 2/1947 | Schulze et al. ............... | 260/668 |
|---|---|---|---|
| 2,662,844 | 12/1953 | Leffer ........................... | 196/49 |
| 3,404,086 | 10/1968 | Plank et al. .................... | 208/120 |
| 3,406,112 | 10/1968 | Bowles .......................... | 208/153 |
| 3,186,805 | 6/1965 | Gomory ......................... | 23/288 |
| 3,246,980 | 4/1966 | Sharp et al. .................... | 23/288 |
| 3,524,809 | 8/1970 | Hansford ........................ | 208/111 |
| 2,956,003 | 10/1960 | Marshall et al. ............... | 208/74 |

*Primary Examiner*—Delbert E. Gantz
*Assistant Examiner*—G. E. Schmitkons
*Attorneys*—Meyer Neishloss, Deane E. Keith and Alvin E. Ring ABSTRACT: A total hydrocarbon feed is segregated into relatively low and high molecular weight fractions and the fractions are charged to separate reactors. The fraction in each reactor is cracked in the presence of a fluid zeolite catalyst or a catalyst of comparable activity and/or selectivity which produces a transient maximum gasoline yield at a residence time of 5 seconds or less and in the presence of a diluent vapor or vapors which lower the partial pressure of the hydrocarbon feed and increase gasoline selectivity. Residence time in each reactor is established by controlling the total charge rate of hydrocarbon and diluent vapor to the reactor. The ratio of diluent vapor or vapors to hydrocarbon feed in each reactor is also controlled so that a greater yield of gasoline is recovered from each reactor than could be recovered in the absence of the diluent vapor.

EFFECT OF HYDROCARBON PARTIAL PRESSURE (PSIG)
AT VARIOUS CONTACT TIMES (SECONDS)

INVENTORS.
MILLARD C. BRYSON
JAMES R. MURPHY

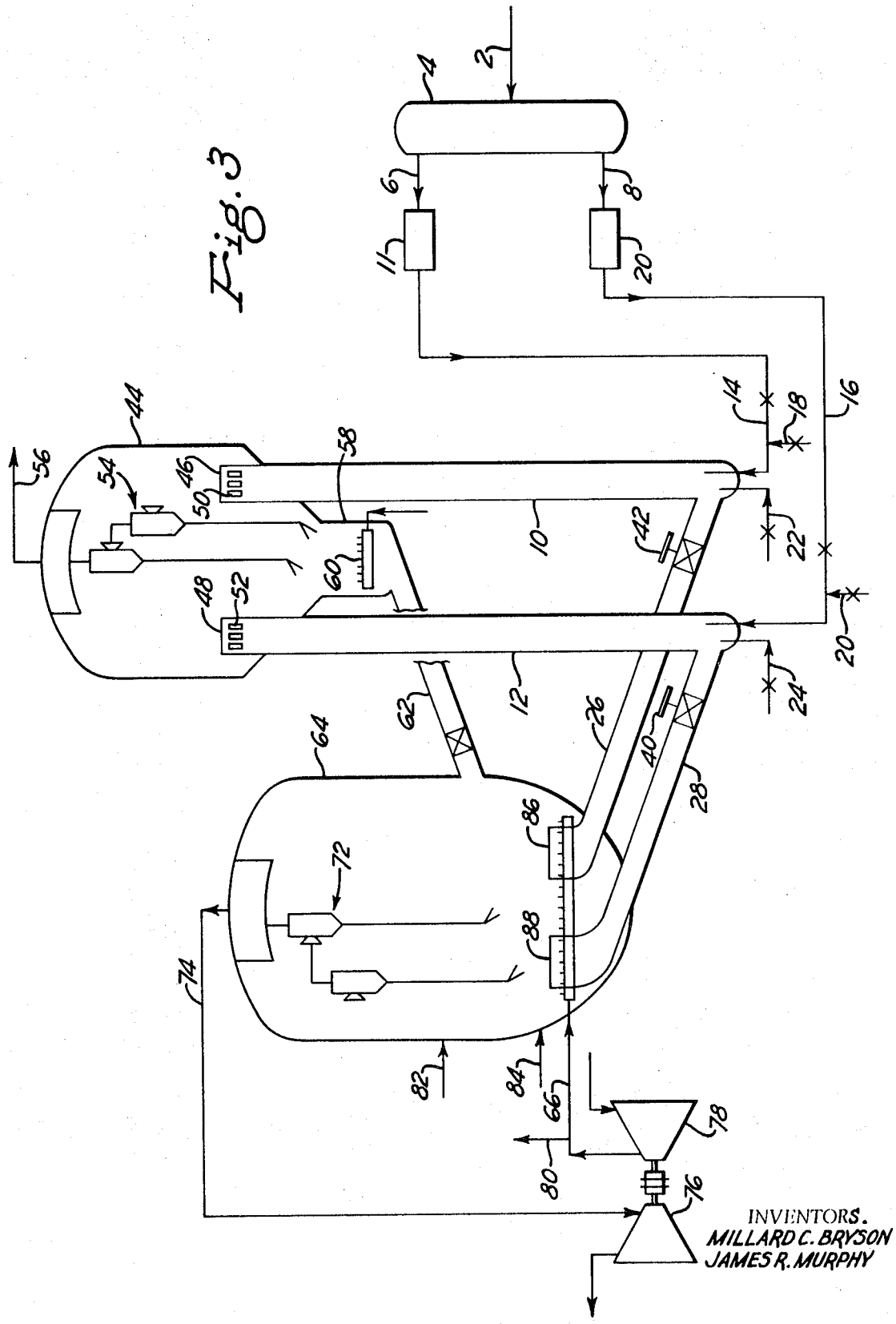

FLUID CATALYTIC CRACKING PROCESS WITH A SEGREGATED FEED CHARGED TO SEPARATE REACTORS

This invention relates to the cracking of a petroleum hydrocarbon feed stock to gasoline in the presence of a highly active fluid cracking catalyst such as a crystalline aluminosilicate zeolite or a catalyst of comparable activity, or selectivity, or both.

Natural or synthetic zeolite aluminosilicate cracking catalysts exhibit high activity in the cracking of hydrocarbon oils both in terms of total conversion of feed stock and in terms of selectivity towards gasoline production. The present invention relates to a method for improving the selectivity to gasoline production in cracking processes utilizing a fluidized zeolitic cracking catalyst or a catalyst of comparable activity and/or selectivity.

In fluid catalytic cracking operations it is generally advantageous to operate the cracking reactor at pressures in the range of about 20 to 30 pounds per square inch gauge and it is undesirable in terms of the integrated operation including catalyst regeneration and power recovery from regenerator flue gases for reactor pressures to fall significantly below this level. For example, catalyst regeneration is generally favorably influenced by elevated temperatures and pressures. Furthermore, in systems where regenerator flue gas is utilized to drive a turbine to compress combustion air to be supplied to the regenerator, it is important to maintain an elevated pressure in the regenerator in order to obtain efficient turbine operation. Since spent catalyst must flow from the reactor zone to the regenerator, a correspondingly high pressure is consequently required in the reactor in order to urge catalyst towards the regenerator. However, as shown below, relatively high reactor hydrocarbon feed pressures are less favorable to gasoline selectivity in the cracking operation than relatively low pressures.

In accordance with the present invention a method is presented for advantageously improving operation of a reaction process employing a zeolitic or similar fluidized cracking catalyst without lowering the pressure in the reaction zone or catalyst disengaging or stripping vessel. We have discovered that an unexpected advantage occurs by charging a diluent gas to the inlet of the cracking reaction zone to lower the partial pressure of the charge hydrocarbon in the reaction zone without disturbing the total pressure in the system. Any diluent which is a vapor or becomes a vapor under the conditions of the reaction zone can be used. An inert gas such as steam or nitrogen is a suitable diluent. A mixture of gases can be employed. If the diluent is a hydrocarbon, it should desirably have a boiling point below about 430° F., i.e. it should be a gasoline range hydrocarbon or lighter. If it boils above the gasoline range it will itself be a portion of the cracking feed. Recycle methane or ethylene could be employed. We have found that a lower hydrocarbon feed partial pressure at any given reaction zone total pressure produces the unexpected effect of increasing the selectivity to gasoline production at a given conversion level of fresh feed or, conversely, requiring a lower conversion of total feed to produce a given gasoline yield.

Although it has been known that the use of an inert diluent such as steam at the hydrocarbon feed zone accomplishes certain advantageous effects in a fluid catalytic cracking operation such as assisting in fluidization of catalyst, vaporization of liquid feed, dispersal of catalyst into hydrocarbon feed, increasing reaction rate, etc., the improvement in gasoline selectivity has not heretofore been appreciated. We have further discovered that the gasoline selectivity advantage is transient and is lost if the cracking process is not terminated in a timely manner, as explained below. Because of its transient nature the selectivity advantage has heretofore been effectively masked.

It has previously been considered that the amount of steam to be employed in a fluid catalytic cracking process should not be great in order to avoid a reduction in residence time, and thereby a loss in conversion. However, in accordance with the present invention the amount of steam or other inert gas must be sufficient to produce a significant reduction in partial pressure of the incoming hydrocarbon capable of being cracked to gasoline. Although the initial increments of partial pressure reduction exert a greater effect upon gasoline selectivity than later increments, the greater the amount of steam or other inert gas introduced relative to hydrocarbon feed the greater will be the effect upon selectivity. For example, 10 mol percent steam based on hydrocarbon charge will reduce the partial pressure of the hydrocarbon charge 10 percent, 15 mol percent steam will reduce the partial pressure of the hydrocarbon charge 15 percent, etc., and the greater the reduction in partial pressure the greater the gasoline selectivity advantage it is possible to achieve in accordance with this invention.

In accordance with the present invention it has further been discovered that the selectivity advantage due to the presence of an inert gas, which is not itself capable of being cracked to gasoline, is most significant in the very early stages of the cracking reaction, which is also the period in which most of the cracking of fresh feed occurs. In fact, the curve of production of cracked hydrocarbon vapors from fresh feed with time is exponential with the greatest rate of cracking occurring at the outset of the reaction so that the cracked vapors themselves quickly reduce the partial pressure of the unreacted feed. However, by the time these vapors are produced most of the cracking has been completed. The extent of cracking of fresh hydrocarbon feed with a zeolite catalyst is considerably greater in the first 0.1 second interval in the reaction zone than in the second 0.1 second interval. Similarly, the extent of cracking of fresh hydrocarbon charge is considerably greater in the first 0.2 second interval in the reaction zone than in the second 0.2 second interval. For example, after the hydrocarbon feed has been in the reaction zone for about 0.1 second it is about 40 percent converted and after about 1.0 second conversion increases only to about 70 to 80 percent.

In control methods for fluid catalytic cracking operations according to the prior art, a vapor such as steam was added to the inlet of an elongated riser or reaction zone to assist dispersal of catalyst into hydrocarbon. The amount of steam was not considered particularly critical. Reactor residence time (space velocity) was then adjusted to control gasoline yield in the reactor effluent. If analysis of reactor effluent indicated an adjustment of the residence time was required, the hydrocarbon flow rate was adjusted. But no criticality was attached to the fact that this adjustment varied the ratio of steam to hydrocarbon at the reaction zone inlet. In accordance with the present invention reaction zone residence time is established not only by establishing the total charge rate including both hydrocarbon and steam but also by establishing the ratio of steam to hydrocarbon in the charge in the manner described below. We have now discovered and it is shown below that control of the ratio of steam to hydrocarbon in the charge and control of the total charge rate including both steam and hydrocarbon are interdependent and interdependently exert a critical effect on gasoline yield.

Although zeolitic aluminosilicates are especially useful catalysts for purposes of the present invention, any silica alumina or other cracking catalyst which is sufficiently active and/or selective to be capable of producing a transient maximum or peak gasoline yield from the total fresh hydrocarbon feed capable of being cracked to gasoline at residence times of 5 seconds or less are within the purview of this invention. The maximum gasoline yield obtained at residence times within five seconds is transient and rapidly diminishes. After a residence time of 1 second, most of the fresh hydrocarbon feed is converted and there is a sharp drop in rate of conversion of fresh feed. However, if the hydrocarbon continues to remain in contact with the catalyst, products of the earlier cracking operation themselves in turn undergo cracking. This occurrence is termed "aftercracking." Since there is a greater abundance of cracked material than uncracked material after only about one-half to 1 second of reaction zone residence time or less the situation rapidly arises wherein considerably more cracking of cracked than uncracked material can occur. When this situation prevails, the desired gasoline product initially produced at a high selectivity in accordance with the present invention becomes depleted due to aftercracking at a faster rate than it is replenished due to cracking of remaining uncracked feed so that the selectivity advantage initially achieved is subsequently lost at a significant rate. If timely disengagement of hydrocarbon and catalyst does not occur prior to the occurrence of a significant amount of aftercracking the very existence of the earlier advantageous selectivity effect can be entirely masked. This invention requires substantially instantaneous disengagement of catalyst and hydrocarbon as these materials exit from the reaction zone into a disengaging vessel.

In accordance with the present invention a preheated liquid hydrocarbon charge and a fluid zeolite or comparable cracking catalyst is added to a cracking reaction zone together with an inert gaseous diluent such as steam, nitrogen, recycle methane or ethylene, etc. The liquid hydrocarbon charge is substantially instantaneously vaporized and the quantity of inert diluent is sufficient to accomplish a substantial reduction in the partial pressure of the hydrocarbon charge. The selectivity to gasoline production is enhanced due to the lower hydrocarbon partial pressure at the onset of cracking of the fresh feed due to the presence of the diluent. In order not to subsequently lose the selectivity advantage the hydrocarbon is permitted to remain in the presence of the catalyst only as long as further conversion of uncracked hydrocarbon produces a significant increase in gasoline yield. The system is controlled so that substantially at the time when further conversion of uncracked hydrocarbon produces no significant net increase in gasoline yield or at the time when some decrease in gasoline yield ensues the catalyst and hydrocarbon are substantially instantaneously disengaged from each other to prevent aftercracking of gasoline product from destroying the selectivity advantage initially achieved due to the diluent partial pressure effect. Analysis of the product to measure total conversion of fresh feed or gasoline yield or both will aid in controlling the reactor in accordance with this invention. These analyses will provide a measure of gasoline selectivity for controlling the reactor. Reaction time duration can be adjusted by regulation of total feed rate, including hydrocarbon and steam, where the reactor height is fixed.

In accordance with this invention, the reactor is operated so that there is a continual increase in gasoline throughout substantially the entire length of the reactor coupled with a decrease in fresh feed, which means that the reaction is terminated at or near the time of maximum gasoline yield. There is a substantial absence of backmixing in the reactor since this would be conducive to aftercracking. Backmixing can be caused by an excessive linear velocity which gives rise to turbulence or by the formation of a dense catalyst bed which induces turbulence in flowing vapors. The hydrocarbon remains in the reactor only until a decrease in fresh feed content is not accompanied by any substantial further net increase in gasoline. Maximum gasoline yield is accompanied by maximum gasoline selectivity.

The overall time of contact between hydrocarbon and catalyst can be as low as about 0.5 second or less but not greater than about 5 seconds and will depend upon many variables in a particular process such as the boiling range of the charge, the particular catalyst, the amount of carbon on the regenerated catalyst, the catalyst activity, the reaction zone temperature, the polynuclear aromatic content of the hydrocarbon feed, etc. Some of these variables can affect one another. For example, if the fresh hydrocarbon charge includes a considerable quantity of polynuclear aromatics, the reaction should be permitted to proceed long enough to crack any mono- or di-aromatics or naphthenes because these compounds produce relatively high gasoline yields and are the most readily crackable aromatics but the reaction should be terminated before significant cracking of other polynuclear aromatics occurs because cracking of these latter compounds occurs at a slower rate and result in excessive deposition of carbon on the catalyst. It is clear, that no fixed cracking time duration can be set forth but the time will have to be chosen within the range of this invention depending upon the particular system. In one system, slightly exceeding a 1.0 second residence time might result in such severe aftercracking that the selectivity advantage would be lost while in another system unless a 1.0 second residence time is appreciably exceeded there might not be sufficient cracking of charge hydrocarbon to render the process economic. Generally, the residence time will not exceed 2.5 of 3 seconds and 4-second residence times will be rare.

Reference to FIG. 1 will illustrate the significance of the present invention. FIG. 1 contains curves semiquantitatively relating the amount of unreacted charge and gasoline, as percent based on fresh feed, to reaction zone residence time. The curve of unreacted charge which is typical of most fluid cracking charge stocks shows that the amount of unreacted charge asymptotically approaches a value somewhat less than 20 percent of fresh feed within residence times of this invention. The curves showing quantity of gasoline produced show that the quantity of gasoline produced rapidly reaches a somewhat flat maximum or peak which generally coincides with the time at which the cracking of unreacted charge is substantially diminished. The gasoline yield at the peak for a given feed will be determined mostly by reactor temperature, to an extent by the level of carbon on the catalyst and to an extent by the catalyst to oil ratio. After reaching a peak, the gasoline level diminishes because the aftercracking of gasoline predominates over production of gasoline from the unreacted feed. The lower of the two gasoline curves shown in FIG. 1 indicates the level of gasoline in the reaction zone assuming substantially no inert diluent such as steam is introduced to the inlet zone of the reactor. The upper of the two gasoline curves schematically shows the higher gasoline level achieved by adding an inert diluent such as steam to the inlet of the reaction zone which lowers the hydrocarbon feed partial pressure and thereby increases selectivity to gasoline.

Assuming a fluid cracking process is operating with steam addition and the gasoline yield is at point A shown in FIG. 1 where significant aftercracking has occurred. In order to reduce the extent of aftercracking it is decided to increase the charge rate of hydrocarbon into the reaction zone, thereby reducing hydrocarbon residence time. Residence time is usually adjusted by adjustment of hydrocarbon charge rate rather than steam charge rate since for any given percentage increase or decrease in charge rate of steam or hydrocarbon, the effect upon reaction residence time will be much greater in the case of the hydrocarbon adjustment because the total amount of hydrocarbon charged is so much greater than the total amount of steam charged. Due to the shorter residence time and concomitant reduction in aftercracking a higher gasoline yield B is achieved. However, because the hydrocarbon partial pressure at the reaction zone inlet has been increased by an increase in hydrocarbon flow rate, the point B is removed from the upper gasoline curve in the direction of the lower gasoline curve and is outside the cross-hatched zone which denotes the range of this invention. The cross-hatched zone shown in FIG. 1 denotes the transient elevated gasoline yields of this invention which can be recovered by the use of an inert vapor but which could not be recovered absent an inert vapor. On the other hand, if the same decrease in hydrocarbon residence time were achieved by increasing both hydrocarbon and steam flow rate in the same ratio so that the partial pressure of hydrocarbon at the reaction zone inlet remained unchanged at the new residence time, the new operating point would be at B', instead of B, which is within the range of the present invention. (Of course, if the same total flow rate were achieved by increasing the ratio of steam to hydrocarbon the new operating point would be above B' and the area covered by the cross-hatched zone of this invention would be enlarged.) Now, if the hydrocarbon charge rate is again increased to further reduce residence time, the point C is reached which is further removed from the upper gasoline curve in the direction of the lower gasoline curve than is point B because the hydrocarbon partial pressure is further increased in going from point B to point C. Again, because of the increase in hydrocarbon partial pressure, point C is outside the range of the invention. On the other hand, if the same residence time indicated at point C is achieved by increasing the flow rate of both steam and hydrocarbon, rather than hydrocarbon alone, so that the hydrocarbon partial pressure at the new residence time is the same as is was at point A, the point C' is achieved which is within the range of this invention.

It is seen from FIG. 1, that operating points B and C represent essentially similar gasoline conversion levels occurring at different residence times apparently indicating that these points lie close to a flat maximum gasoline yield. However, points B and C lie outside the range of the present invention while operating points B' and C', which are within the range of this invention, lie at higher gasoline yield levels than points B and C, even though points B and B' and points C and C' represent the same residence times, respectively. Starting from point A, point B' is reached by the method of lowering residence time via a change in both steam flow rate and hydrocarbon flow rate while, also starting from point A, point B is reached by the method of changing hydrocarbon flow rate only to achieve the same residence time as point B'. Starting from point B', point C' is reached by changing both steam flow rate and hydrocarbon flow range to lower the residence time, while point C is reached by the simpler method of changing hydrocarbon flow rate only to achieve the same residence time as the point C'. It is apparent that to achieve the gasoline selectivity advantage of the present invention, the residence time and the apportioning of steam and hydrocarbon flow rates to achieve said residence time are interdependent and represent a critical combination for purposes of process control.

While the partial pressure effect of this invention tends to increase selectivity to gasoline, there is a competing effect in a cracking process which tends to mask the partial pressure effect. This competing effect arises due to carbon laydown on the catalyst. As the amount of carbon on the catalyst increases the gasoline selectivity decreases. The higher the molecular weight of the feed hydrocarbon the greater the carbon on catalyst competing effect because the high molecular weight components tend to be highly aromatic and aromatic compounds yield more coke on cracking than nonaromatics. Of the aromatic compounds polynuclear compounds not only crack at a slower rate but also have a much higher selectivity to $C_2$ and lighter gases and coke, while the mono and di-aromatics and the alkyl side chains of naphthenes tend not only to crack at a faster rate but also to exhibit the highest selectivity to gasoline. Therefore, the heavier hydrocarbon components should be subjected to a reduced residence time, such as only about 0.5 to 1.5 seconds, in order to limit the cracking thereof as much as possible to paraffinic side chains and mono- and di-aromatics in general.

In accordance with this invention the feed hydrocarbon is fractionated and a relatively lower molecular weight fraction capable of being cracked to gasoline is charged with regenerated catalyst to one reactor while a relatively higher molecular weight fraction capable of being cracked to gasoline is charged with regenerated catalyst to a separate reactor. In this manner the relatively light and heavy hydrocarbon feed fractions are cracked in the absence of each other. While each feed fraction is cracked in the presence of a vapor diluent to lower its partial pressure the heavy feed fraction is cracked in the presence of a much higher quantity of diluent or higher ratio of diluent to hydrocarbon than is the lighter feed fraction in order to achieve both a much lower partial pressure and a much lower residence time in the heavy feed reactor. While the residence time in the lighter feed reactor can be above 2 or 3 seconds, the residence time in the heavier feed reactor is generally 1.5 or 2 seconds, or less.

It is shown below that segregating the total hydrocarbon feed into relatively high and low molecular weight fractions as described provides an increased selectivity to gasoline in the combined system as compared to charging an unsegregated full range hydrocarbon to a single reactor. Data presented below show that a heavy carbon laydown on the catalyst (such as is contributed by a heavy feed) is a greater detriment to gasoline selectivity when cracking a relatively low boiling feed than when cracking a relatively high boiling feed, although it is a detriment with both. Therefore, a net advantage in terms of gasoline selectivity is achieved by permitting the low molecular weight feed to undergo cracking in the absence of the heavy feed. It is also shown below that the heavy feed undergoes cracking at a faster rate and a lower selectivity to gasoline than the lighter feed. By utilizng separate reactors, a much higher ratio of diluent vapor to hydrocarbon feed can be introduced to the heavy reactor as compared to the light reactor, thereby tending to not only decrease the residence time of the heavy feed relative to the lighter (thereby advantageously decreasing conversion of heavy feed) but also tending to increase gasoline selectivity (thereby tending to overcome the selectivity disadvantage due to heavy carbon laydown in the heavy reactor). It is seen that the carbon on catalyst effect and the vapor pressure effects described are interdependent and are manipulated to cooperate and enhance gasoline selectivity in the overall system.

In any particular process the gasoline yield and residence time values which encompass the gasoline selectivity advantage of the present invention will depend upon many variables peculiar to the particular process. These variables include the particular catalyst which is employed, the level of carbon on the regenerated catalyst, catalyst activity and/or selectivity, the temperature, the refractory characteristics of the feed, etc. The extent of the selectivity advantage of this invention might be as low as one-half percent to 1 percent or as high as three to 5 percent depending upon the ratio of diluent vapor to hydrocarbon feed at the reactor inlet. Where gasoline is the most economically desirable product of the cracking operation, the economic value of a selectivity advantage of even one-half or 1 percent actually recovered as effluent is considerable in a commercial reactor unit which processes 1000,000 or 150,000 barrels per day of hydrocarbon feed.

The reaction temperature in accordance with this invention is at least about 900° F. The upper limit can be about 1,100° F., or more. The preferred temperature range is 950° to 1,050° F. The reaction total pressure can vary widely and can be, for example, 5 to 50 p.s.i.g., or preferably, 20 to 30 p.s.i.g. The maximum residence time is 5 seconds, and for most charge stocks the residence time will be about 1.5 or 2.5 seconds or, less commonly, 3 or 4 seconds. For high molecular weight charge stocks which are rich in aromatics a 0.5 to 1.5 second residence time could be suitable in order to crack mono- and di-aromatics and naphthenes which are the aromatics which crack most easily and which produce the highest gasoline yield, but to terminate the operation before appreciable cracking of polyaromatics occurs because these materials produce high yields of coke and $C_2$ and lighter gases. The length to diameter ratio of the reactor can vary widely, but the reactor should be elongated to provide a high linear velocity, such as 25 to 75 feet per second, and to this end a length to diameter ratio above 20 or 25 is suitable. The reactor can have a uniform diameter or can be provided with a continuous taper or a stepwise increase in diameter along the reaction path to maintain a nearly constant velocity along the flow path. The amount of diluent can vary depending upon the ratio of hydrocarbon to diluent desired for control purposes. If steam is the diluent employed, a typical amount to be charged can be about 10 percent by volume, which is about 1 percent by weight, based on hydrocarbon charge. A suitable but nonlimiting proportion of diluent gas, such as steam or nitrogen, to fresh hydrocarbon feed can be 0.5 to 10 percent by weight.

A zeolite catalyst is a highly suitable catalytic material in accordance with this invention. A mixture of natural and synthetic zeolites can be employed. Also a mixture of crystalline zeolitic organosilicates with nonzeolitic amorphous silica aluminas is suitable as a catalytic entity. Any catalyst containing zeolitic material or otherwise which provides a transient maximum gasoline yield within a 5-second residence time is suitable. The catalyst particle size must render it capable of fluidization as a disperse phase in the reactor. Typical and nonlimiting fluid catalyst particle size characteristics are as follows:

| Size (Microns) | 0-20 | 20-45 | 45-75 | >75 |
|---|---|---|---|---|
| Weight percent | 0-5 | 20-30 | 35-55 | 20-40 |

These particle sizes are usual and are not peculiar to this invention. A suitable weight ratio of catalyst to total oil charge is about 4:1 to about 12:1 or 15:1 or even 25:1, generally, or 6:1 to 10:1, preferably. The fresh hydrocarbon feed is generally preheated to a temperature of about 600° to 700° F. but is generally not vaporized during preheat, and the additional heat required to achieve the desired reactor temperature is imparted by hot, regenerated catalyst.

The weight ratio of catalyst to hydrocarbon in the feed is varied to affect variations in reactor temperature. Furthermore, the higher the temperature of the regenerated catalyst the less catalyst is required to achieve a given reaction temperature. Therefore, a high regenerated catalyst temperature will permit the very low reactor density level set forth below and thereby help to avoid backmixing in the reactor. Generally, catalyst regeneration can occur at an elevated temperature of about 1,240° F. or 1,250° F. or more to reduce the level of carbon on the regenerated catalyst from about 0.6 to 1.5 to about 0.05 to 0.3 percent by weight. At usual catalyst to oil ratios in the feed, the quantity of catalyst is more than ample to achieve the desired catalytic effect and therefore if the temperature of the catalyst is high, the ratio can be safely decreased without impairing conversion. Since zeolitic catalysts are particularly sensitive to the carbon level on the catalyst, regeneration advantageously occurs at elevated temperatures in order to lower the carbon level on the catalyst to the stated range or lower. Moreover, since a prime function of the catalyst is to contribute heat to the reactor, for any given desired reactor temperature the higher the temperature of the catalyst charge the less catalyst is required. The lower the catalyst charge rate the lower the density of the material in the reactor. As stated, low reactor densities help to avoid backmixing.

The reactor linear velocity, while not being so high that it induces turbulence and excessive backmixing, must be sufficiently high that substantially no catalyst accumulation or buildup occurs in the reactor because such accumulation itself leads to backmixing. (Therefore, the catalyst to oil weight ratio at any position throughout the reactor is about the same as the catalyst to oil weight ratio in the charge.) Stated another way, catalyst and hydrocarbon at any linear position along the reaction path both flow concurrently at about the same linear velocity, thereby avoiding significant slippage of catalyst relative to hydrocarbon. A buildup of catalyst in the reactor leads to a dense bed and backmixing which in turn increases the residence time in the reactor for at least a portion of the charge hydrocarbon and induces aftercracking. Avoiding a catalyst buildup in the reactor results in a very low catalyst inventory in the reactor, which in turn results in a high space velocity. Therefore, a space velocity of over 100 or 120 weight hydrocarbon per hour per weight of catalyst inventory is highly desirable. The space velocity should not be below 35 and can be as high as 500. Due to the low catalyst inventory and low charge ratio of catalyst to hydrocarbon, the density of the material at the inlet of the reactor in the zone where the feed is charged can be only about 1 to less than 5 pounds per cubic foot, although these ranges are nonlimiting. An inlet density in the zone where the low molecular weight feed and catalyst is charged below 4 or 4.5 pounds per cubic foot is desirable since this density range is too low to encompass dense bed systems which induce backmixing. Although, conversion falls off with a decrease in inlet density to very low levels, we have found the extent of aftercracking to be a more limiting feature than total conversion of fresh feed, even at an inlet density of less than 4 pounds per cubic foot. At the outlet of the reactor the density will be about half of the density at the inlet because the cracking operation produces about a four fold increase in mols of hydrocarbon. The decrease in density through the reactor can be a measure of conversion.

A wide variety of hydrocarbon oil charge stocks can be employed. A suitable charge is a gas oil boiling in the range of 430° to 1,100° F. As much as 5 to 20 percent of the fresh charge can boil above this range. Some residual oil can be charged. A 0 to 5 percent recycle rate can be employed Generally, the recycle will comprise 650° F. + oil from the product distillation zone which contains catalyst slurry. If there is no catalyst entrainment, recycle can be omitted.

EXAMPLE 1

A series of test were conducted which illustrate the effect of reducing hydrocarbon partial pressure upon selectivity to debutanized gasoline and to $C_3$+liquid yield. The tests were conducted in an elongated reactor and the hydrocarbon partial pressure was reduced by addition of steam and nitrogen with the feed hydrocarbon. The ranges of conditions of the various test were as follows:

| Charge Stock Inspections | |
|---|---|
| Gravity: °API | 25.6 |
| Sulfur: Weight percent | 0.8 |
| Ramsb. Carbon Residue: | |
| Weight percent | 0.42 |
| Vac. Distillation | |
| (corres. to 760 mm. Hg) | |
| °F. at | |
| 10% | 580 |
| 30% | 692 |
| 50% | 767 |
| 70% | 847 |
| 90% | 969 |
| $C_A$ (percent of aromatic atoms) | 0.18 |
| Catalyst | Zeolite (50-60 Kellogg 2 Hour Activity) |
| Cracking Conditions | |
| Temperature: °F. | 950 |
| Contact Time: Seconds | 0.1-2.0 |
| Cat-to-Oil Ratio | 6.5-9.0 |
| Recycle | none |
| Riser Total Pressure: | |
| p.s.i.g. | 23-30 |
| Riser Gas Composition (Inlet): | |
| Mol Percent | |
| Hydrocarbon | 5-80 |
| Steam | 5-90 |
| Nitrogen | 2-31 |

Figure 2:
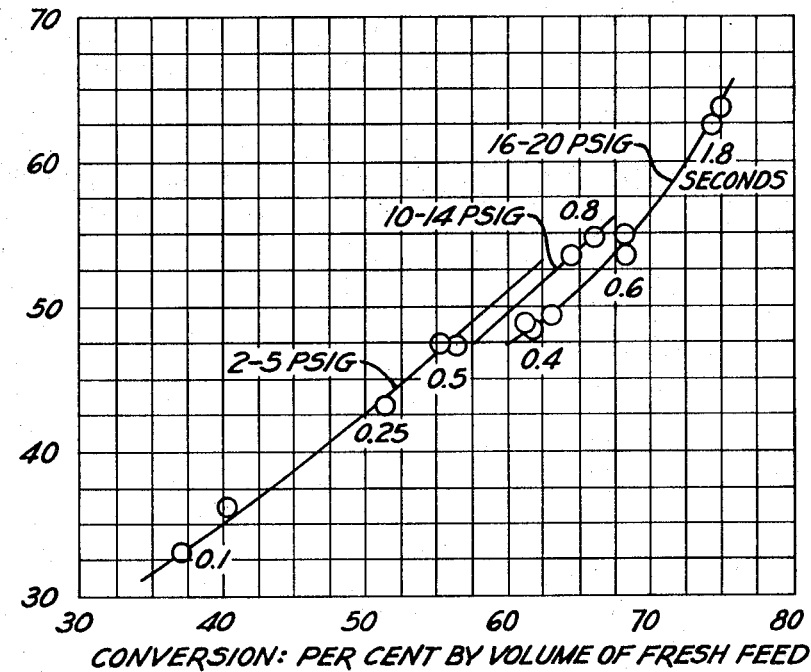

The results of the tests are illustrated in FIG. 2 in which debutanized gasoline yield and total $C_3$+liquid yield, both reported as percent by volume of fresh feed, are plotted against total conversion at various partial pressures of hydrocarbon in the system and at various residence times. The pressure ranges given on the face of the graphs indicate the partial pressure in the system of all hydrocarbon vapors, cracked and uncracked, with the remainder of the reactor pressure accounted for by nitrogen and steam, both nitrogen and steam being used in all tests. For each partial pressure, conversion data is indicated for one or more residence times.

As shown in FIG. 2, at any given conversion level the selectivity to gasoline as well as to total $C_3$+liquid increases with decreasing hydrocarbon partial pressure. Taking a 60 percent conversion level for purposes of example, when the hydrocarbon partial pressure is 16-20 p.s.i.g., the gasoline yield is 47.5 percent; when the hydrocarbon partial pressure is 10-14 p.s.i.g. the gasoline yield increases to almost 50 percent; and when the hydrocarbon partial pressure is 2-5 p.s.i.g. the gasoline yield increases still further to about 51.5 percent. Advantageously, a greater improvement in gasoline selectivity occurred in reducing hydrocarbon partial pressure from 16-20 p.s.i.g., to 10-14 p.s.i.g. than occurred in reducing hydrocarbon partial pressure from 10-14 p.s.i.g. to the very low partial pressure level of 2-5 p.s.i.g. This shows that the gasoline selectivity advantage of this invention was realized to a very significant extent in the initial partial pressure reduction step of the tests and the effect was not as great but still substantial in the second partial pressure reduction step of the tests.

EXAMPLE 2

Tests were conducted to illustrate the advantage of a crystalline zeolite aluminosilicate catalyst over an amorphous silica-alumina catalyst in a fluid catalytic cracking system. Both catalysts were tested under sufficiently low space velocity conditions that a dense phase bed formed in the reactor. The results are shown in table 1.

TABLE 1

| Charge Stock | | | |
|---|---|---|---|
| Characterization Factor | | 12.09 | 11.95 |
| Gravity: °API | | 29.7 | 29.4 |
| Sulfur: Percent | | 0.42 | 0.36 |
| Viscosity, SUS at: °F. | | | |
| 130 | | 60.3 | — |
| 150 | | 51.1 | — |
| 210 | | 38.6 | 37.3 |
| Carbon Residue, Ramsbottom: | Percent ASTM D524 | 0.23 | 0.21 |
| Aniline Point: °F. | | 188 | 184 |
| Bromine Number, D1159 | | 2.8 | 3.0 |
| Pour Point, D97: °F. | | 90 | — |
| Nitrogen: p.p.m. | | 710 | 450 |
| Metals: p.p.m. | | | |
| Vanadium | | 0.2 | 0.4 |
| Nickel | | 0.2 | 0.1 |
| Distillation Vac. (Corres. to 760 mm. Hg) | | | |
| 10% over at: °F. | | 568 | 556 |
| 30 | | 659 | 622 |
| 50 | | 744 | 699 |
| 70 | | 845 | 809 |
| 90 | | 979 | 939 |
| 95 | | — | 991 |
| Catalyst | 100 percent Amorphous silica-alumina | | 60 percent zeolite, 40 percent silica-alumina |
| Kellogg Activity (2-Hour) | | 33.8 | 50.6 |
| Operating Conditions: Reactor | | | |
| Fresh Feed Rate: B/D | | 13,571 | 13,704 |
| Reactor Bed Temperature: °F. | | 926 | 935 |
| Feed Preheat Temperature: °F. | | 700 | 649 |
| Reactor Bed Pressure: p.s.i.g. | | 11.5 | 11.0 |
| Space Velocity, (Total Feed): Wt./Hr./Wt. | | 3.94 | 3.07 |
| Catalyst to Oil Ratio (Total Feed): Wt./Wt. | | 12.5 | 9.8 |
| Recycle: Percent by Volume of Fresh Feed | | 74.3 | 31.4 |
| Carbon on Regenerated Cat. % by Wt. | | 0.4 | 0.38 |
| Conversion: % by Volume of Fresh Feed | | 75.5 | 85.5 |
| Operation Conditions: Regenerator | | | |
| Regen. Bed Temperature: °F. | | 1,141 | 1,166 |
| Total Regen. Air: Mlb./Hr. | | 153.7 | 166.72 |
| Lb. Coke Burned/Lb. Air: Wt./Wt. | | 0.087 | 0.083 |
| Yields: % by Volume of Fresh Feed | | | |
| Debutanized Gasoline | | 47.5 | 61.0 |
| Butane-Butene | | 21.2 | 21.6 |
| i-Buyane | | 7.6 | 10.3 |
| n-Butane | | 2.1 | 1.7 |
| Butenes | | 11.6 | 9.6 |
| Propylene | | | |
| Propane | | 4.2 | 5.7 |
| Propylene | | 8.5 | 5.9 |
| Total Liquid Recovery | | 105.9 | 108.7 |
| $C_2$ and Lighter Gas: % by Wt. | | 4.4 | 2.9 |
| Coke: % by Wt. | | 7.73 | 7.8 |
| Inspections | | | |
| Motor, Clear | | — | 81.3 |
| Motor, +3 cc. TEL | | 86.1 | 89.4 |
| Research, Clear | | 94.0 | 93.4 |
| Research, +3 cc. TEL | | 100.4 | 98.3 |

As shown in table 1, the zeolite catalyst system exhibited a conversion of 85.5 percent compared to only 75.5 percent for the amorphous catalyst. In addition, the zeolite catalyst system exhibited a 61.0 percent yield of gasoline compared to only 47.5-percent gasoline yield with the amorphous catalyst. However, while the total yield of $C_3$ and $C_4$ hydrocarbons is about the same for the zeolite and the amorphous catalyst, the proportion of these $C_3$ and $C_4$ hydrocarbons which is olefinic is lower when utilizing a zeolite catalyst in these tests. This is a disadvantage arising when utilizing a zeolite catalyst with extended residence times in a dense catalyst bed because $C_3$ and $C_4$ olefins are useful for the production of alkylate which can be blended with the gasoline produced directly by cracking to improve its octane value.

EXAMPLE 3

Further tests were conducted to illustrate the use of the same type of zeolite catalyst employed in example 2 for fluid catalytic cracking not only at relatively high residence times involving space velocities low enough to permit a dense phase catalyst bed to form in the reactor but also at very low residence times within the range of this invention at which the velocity through the reactor is sufficiently high that no bed formation within the reactor and therefore no backmixing due to bed formation is permitted to occur. The results are shown in table 2.

TABLE 2

| Test | 1 | 2 | 3 | 4 |
|---|---|---|---|---|
| Catalyst | Zeolite | Zeolite | Zeolite | Zeolite |
| Catalyst bed formation | Yes | No | Yes | No |
| Cracking temperature. °F. | 950 | 950 | 1,000 | 1,000 |
| Space velocity (totalfeed) | 19.2 | >100 | 19.3 | >100 |
| Contact time, seconds | (1) | 0.5 | (1) | 2.0 |
| Recycle, percent by volume | 2.4 | 5.3 | None | None |
| Conversion, percent by volume | 72.9 | 77.1 | 76.2 | 80.9 |
| Yields, percent by volume of fresh feed | | | | |
| Total: | | | | |
| $C_3$ | 9.9 | 10.4 | 11.7 | 11.3 |
| $C_3=$ | 6.6 | 6.7 | 7.5 | 9.0 |
| Total: | | | | |
| $C_4$ | 14.2 | 16.0 | 15.8 | 17.7 |
| $C_4=$ | 6.8 | 7.6 | 8.0 | 7.8 |
| Debutanized gasoline | 55.8 | 60.2 | 56.2 | 63.8 |
| $C_5=$ | 4.8 | 4.8 | 5.0 | 4.3 |
| $C_5$ plus gasoline | 44.2 | 47.9 | 44.8 | 50.8 |
| Total $C_3$ plus liquid | 106.8 | 109.5 | 107.5 | 111.9 |
| $C_2$ and lighter, percent by weight | 3.6 | 2.5 | 4.1 | 2.1 |
| Coke, percent by weight | 5.6 | 6.0 | 5.0 | 4.5 |
| Gasoline octane: | | | | |
| Motor, clear | 79.3 | 79.6 | 80.6 | 79.3 |
| Motor, plus 3 cc | 85.4 | 86.2 | 86.4 | 86.3 |
| Research, clear | 92.3 | 92.6 | 93.5 | 91.4 |
| Research, plus 3 cc | 100.2 | 99.6 | 99.5 | 98.7 |

[1] Bed backmixing.

A comparison of tests 1 and 2 of table 2, both conducted at 950° F., shows the deleterious effect of extended residence time when employing a zeolite catalyst. The residence time of test 2 was only 0.5 second and yet it exhibited a higher gasoline yield and a lower $C_2$ and lighter yield than test 1 in which the residence time was considerably longer due to a lower space velocity and backmixing arising in the dense catalyst bed. A comparison of tests 1 and 2 shows that an extended residence time gives arise to aftercracking which diminishes gasoline yield and increases the yield of products boiling lower than gasoline.

Comparing test 3 with test 1, both involving dense bed cracking, it is seen that raising the cracking temperature from 950° to 1,000° F., provided a significant increase in conversion but very little increase in debutanized gasoline yield and a higher yield of $C_2$ and lighter, showing that the high degree of aftercracking occurring in a dense bed reaction system prevents effective control of gasoline yield via temperature adjustment.

Comparing test 4 with test 2, both involving nonbed cracking and very low residence times within the range of this invention, it is seen that raising the cracking temperature from 950° to 1,000° F. provided not only a significant increase in conversion but also an equally significant increase in gasoline yield coupled with a lower yield of both $C_2$ and lighter and coke, showing that the comparative absence of aftercracking at the very low residence times of this invention permits control of gasoline yield via temperature regulation. It is also noted that test 4 provided good yields of $C_3$ olefin and $C_4$ olefin which are valuable materials for preparation of alkylate gasoline.

Since table 2 indicates that in low residence time nondense bed systems gasoline yield can be effectively controlled via temperature regulation, it follows that a reduction in temperature might be useful on occasion in an operating plant to reduce gasoline yield as required by subsequent fractionator load or to decrease $C_3$ olefin and $C_4$ olefin production. However, no matter what the operating temperature is the gasoline yield at that temperature is increased by utilizing the control method of this invention.

EXAMPLE 4

Table 3 shows the results of four tests including a test based upon calculation which illustrate the advantageous effect on

TABLE 3

| Test | 1 | 2 | 3 | 4 |
|---|---|---|---|---|
| Catalyst | (1) | (1) | (1) | (1) |
| Charge stock | (2) | (3) | (4) | (5) |
| Charge stock inspections: | | | | |
| Gravity, °API | 25.6 | 25.6 | 30.5 | 21.4 |
| Sulfur, percent by weight | 0.8 | 0.8 | 0.65 | 1.00 |
| Ramsb. carbon residue, percent by weight | 0.42 | 0.42 | 0.09 | 0.73 |
| Vacuum distillation (corres. to 760 mm. Hg) ° F. at, percent by volume: | | | | |
| 10 | 580 | 580 | 519 | 809 |
| 30 | 692 | 692 | 629 | 831 |
| 50 | 767 | 767 | 659 | 873 |
| 70 | 847 | 847 | 684 | 921 |
| 90 | 969 | 969 | 712 | 1,016 |
| $C_A$—percentage of total atoms which are aromatic atoms | 0.18 | | 0.17 | .20 |
| Operating conditions: | | | | |
| Temperature, ° F | 940 | 940 | 940 | 940 |
| Space velocity (total feed) weight/hour/weight | 6.2 | 6.2 | 6.2 | 6.2 |
| Catalyst-to-oil ratio (total feed) | 7.9 | 8.0 | 8.1 | 8.0 |
| Slurry oil recycle, percent by volume of fresh feed | 5.2 | 5.0 | | 9.9 |
| Carbon on spent catalyst, percent by weight | 1.22 | 1.25 | 0.93 | 1.55 |
| Carbon on regen. cat., percent by weight | 0.3 | 0.3 | 0.3 | 0.3 |
| Gas oil conversion, percent by volume of fresh feed | 80.6 | 82.8 | 80.7 | 85.2 |
| Yields, percent by volume of fresh feed: | | | | |
| Debutanized gasoline | 58.8 | 59.8 | 60.4 | 59.1 |
| Butane—butene | 16.3 | 17.0 | 16.2 | 17.7 |
| Isobutane | 8.0 | 8.7 | 9.1 | 8.3 |
| n-Butane | 2.1 | 2.2 | 2.2 | 2.1 |
| Butenes | 6.2 | 6.2 | 4.9 | 7.3 |
| Propane-propylene | 11.0 | 11.3 | 10.5 | 12.1 |
| Propane | 4.7 | 5.0 | 4.8 | 5.2 |
| Propylene | 6.3 | 6.3 | 5.7 | 6.9 |
| Light catalyst gas oil | 14.2 | 12.2 | 19.3 | |
| Decanted oil | 5.2 | 5.0 | | 9.9 |
| Total | 105.5 | 105.3 | 106.4 | 103.7 |
| Gas, $C_2$ and lighter, percent by weight | 4.0 | 4.0 | 3.5 | 4.4 |
| Coke, percent by weight | 8.6 | 9.0 | 5.6 | 12.5 |
| Total | 12.6 | 13.0 | 9.1 | 16.9 |
| $H_2S$, percent by weight | 0.2 | 0.2 | 0.1 | 0.2 |

1 Zeolite-bed.
2 Full range-unsegregated.
3 Segregated-calculated total yield derived from both streams.
4 Light 50 percent by volume only of full range feed.
5 Heavy 50 percent by volume only of full range feed.

gasoline yield achievable by fractionating a hydrocarbon cracking feed into a relatively high molecular weight fraction and a relatively low molecular weight fraction and separately cracking the fractions in the presence of a zeolite catalyst. Test 1 of table 3 shows the results where a full range hydrocarbon feed is charged to the bottom of a single reactor. Test 3 shows the results where the total feed is fractionated and the lighter 50 percent by volume is alone charged to the bottom of a single reactor. Test 4 shows the results where the heavier 50 percent by volume of the fresh feed is alone charged to the bottom of a single reactor. Test 2 shows the calculated results of an integrated process wherein a total hydrocarbon feed is segregated so that the lighter 50 percent by volume is charged to one reactor and the heavier 50 percent by volume is charged to another reactor and the effluents of the two reactors are combined. All tests were made at a sufficiently low velocity that a dense fluid catalyst bed was formed. All the tests were conducted at the same hydrocarbon partial pressure at the reactor inlet.

Comparing test 3 and test 1 of table 3, it is seen that cracking the light charge alone resulted in about the same conversion as was obtained with a full range charge but at a significantly higher gasoline yield, indicating higher gasoline selectivity. Furthermore, the average carbon level on the catalyst in test 3 was 0.93 less 0.3, or only 0.63 percent, while the average carbon level on the catalyst in test 1 was 1.22 less 0.3 or 0.92 percent. Again, the total $C_2$ and lighter plus coke yield in test 3 was only 9. percent while the total $C_2$ and lighter plus cope yield in test 1 was 12.6 percent. In all these respects the cracking of t light fraction by itself is superior to the cracking of a full range charge.

Opposite results are indicated by comparing test 4 with test 1, whereby it is seen that cracking the heavy charge alone results in a much higher conversion than was obtained with a full range charge but only a slightly higher gasoline yield, indicating much lower gasoline selectivity. Furthermore, the average carbon level on the catalyst in test 4 was 1.55 less 0.3 or 1.25 percent, while the average carbon level on the catalyst in test 1 was only 0.92 percent. Again, the total $C_2$ and lighter plus coke yield in test 3 was 16.9 percent while the total $C_2$ and lighter plus coke yield in test 1 was only 12.6 percent. In all these respects the cracking of the heavy fraction by itself is inferior to the cracking of a full range charge.

Now, comparing calculated test 2 with test 1, it is seen that the combined effects of tests 3 and 4 discussed above result in an integrated process which is favorable to gasoline selectivity in that gasoline yield is increased from 58.8 to 59.8 percent of fresh feed. Therefore, the segregation of the fresh feed as described in this test results in a higher gasoline yield and can cooperate with the vapor pressure effect described above in increasing gasoline yield with a given hydrocarbon fresh feed.

A suitable reactor-regenerator system for performing this invention is described in reference to FIG. 3. The cracking occurs with a fluidized zeolitic catalyst in two parallel elongated reactor tubes 10 and 12, which are referred to as risers. Each riser has a length to diameter ratio of above 20, or above 25, or, if desired, the risers can have different length to diameter ratios or different dimensions and the same ratio. Hydrocarbon oil feed to be cracked in line 2 is first fractionated in column 4 into a relatively low molecular weight fraction which flows through line 6 and a relatively high molecular weight fraction which flows through line 8. The low and high molecular weight fractions are passed through preheaters 11 and 20, respectively, to heat them to about 600° F. and then charged into the bottom of risers 10 and 12 through inlet lines 14 and 16, respectively. Steam is introduced into each oil inlet line through lines 18 and 20. Steam is also introduced independently to the bottom of each riser through lines 22 and 24 to help carry upwardly into the risers regenerated catalyst which flows to the bottom of each riser through transfer lines 26 and 28.

The ratio of steam to hydrocarbon charged to high molecular weight riser 12 is about 2 to 10 times that charged to low molecular weight riser 10, so that the hydrocarbon vapor pressure at the inlet of riser 12 is lower than that at the inlet of riser 10 and so that the residence time in riser 12 is lower than the residence time in riser 10.

The full range oil charge to be cracked in the risers is a gas oil having a boiling range of about 430° to 1,100° F. As indicated above, before being charged the gas oil is fractionated into a low molecular weight fraction which is charged to the bottom of riser 10 and a high molecular weight fraction which is charged to the bottom of riser 12. The quantity of steam added to each riser cn vary widely. The steam is added with both the low and high molecular weight hydrocarbon fractions. The catalyst employed is a fluidized zeolitic aluminosilicate and is added to the bottom of each riser. Each riser temperature range is about 900° to 1,100° F. and is controlled by measuring the temperature of the product from the risers and then adjusting the opening of valves 40 and 42 which regulate the inflow of hot regenerated catalyst to the bottom of each riser. The temperature of the regenerator catalyst is above the control temperature in the risers so that the incoming catalyst contributes heat to the cracking reaction. The riser pressure is between about 10 and 35 p.s.i.g. Between about 0 and 5 percent of the oil charge to each riser can be recycled.

The residence time of both hydrocarbon and catalyst in each riser is very small and ranges from 0.5 to 5 seconds. The lower molecular weight hydrocarbon is usually in riser 10 for about 2 seconds but the higher molecular weight hydrocarbon will generally be in riser 12 for no more than about 1 second. The velocity throughout the risers is sufficiently high so that there is little or no slippage between the hydrocarbon and catalyst flowing through the riser. Therefore, no bed of catalyst is permitted to build up within a riser, whereby the density within the riser is very low. The density within each riser is a maximum of about 4 pounds per cubic foot at the bottom of the riser and decreases to about 2 pounds per cubic foot at the top of the riser. Since no dense bed of catalyst is permitted to build up within any riser the space velocity through the riser is unusually high and will have a range between 100 or 120 and 600 weight of hydrocarbon per hour per instantaneous weight of catalyst in the reactor. No significant catalyst build up within the reactor is permitted to occur and the instantaneous catalyst inventory within a riser is due to a flowing catalyst to oil weight ratio between about 4:1 and 15:1, the weight ratio corresponding to the feed ratio.

The hydrocarbon and catalyst exiting from the top of each riser is passed into a common disengaging vessel 44,. The top of each riser is capped at 46 and 48 so that discharge occurs through lateral slots 50 and 52 for proper dispersion. An instantaneous separation between hydrocarbon and catalyst occurs in the disengaging vessel. The hydrocarbon which separates from the catalyst is primarily gasoline together with some heavier components and some lighter gaseous components. The hydrocarbon effluent passes through cyclone system 54 to separate catalyst fines contained therein and is discharged to a fractionator through line 56. The catalyst separated from hydrocarbon in disengager 44 immediately drops below the outlets of the risers so that there is no catalyst level in the disengager but only in a lower stripper section 58. Steam is introduced into catalyst stripper section 58 though sparger 60 to remove any entrained hydrocarbon in the catalyst.

Catalyst leaving stripper 58 passes through transfer line 62 to a regenerator 64. This catalyst contains carbon deposits which tend to lower its cracking activity and as much carbon as possible must be burned from the surface of the catalyst. This burning is accomplished by introduction to the regenerator through line 66 of approximately the stoichiometrically required amount of air required for combustion of the carbon deposits. The catalyst from the stripper enters the bottom section of the regenerator in a radial and downward direction through transfer line 62. Flue gas leaving the dense catalyst bed in regenerator 64 flows through cyclones 72 wherein catalyst fines are separated from flue gas permitting the flue gas to leave the regenerator through line 74 and pass through a turbine 76 before leaving for a waste heat boiler wherein any carbon monoxide contained in the flue gas is burned to carbon dioxide to accomplish heat recovery. Turbine 76 compresses atmospheric air in air compressor 78 and this air is charged to the bottom of the regenerator through line 66.

The temperature throughout the dense catalyst bed in the regenerator is about 1,250° F. The temperature of the flue gas leaving the top of the catalyst bed in the regenerator can rise due to afterburning of carbon monoxide to carbon dioxide. As mentioned, approximately a stoichiometric amount of oxygen is charged to the regenerator and the reason for this is to minimize afterburning of carbon monoxide to carbon dioxide above the catalyst bed to avoid injury to the equipment since at the temperature of the regenerator flue gas some afterburning does occur. In order to prevent excessively high temperatures in the regenerator flue gas due to afterburning, the temperature of the regenerator flue gas is controlled by measuring the temperature of the flue gas entering the cyclones and then venting some of the pressurized air otherwise destined to be charged to the bottom of the regenerator through vent line 80 in response to this measurement. The regenerator reduces the carbon content of the catalyst from 1±0.5 weight percent to 0.2 weight percent or less. If required, steam is available through line 82 for cooling the regenerator. Makeup catalyst is added to the bottom of the regenerator through line 84. Two hoppers 86 and 88 are disposed at the bottom of the regenerator for receiving regenerated catalyst to be passed to the bottom of the reactor risers through transfer lines 26 and 28.

We claim:

1. In a process for cracking a gas oil hydrocarbon feed to gasoline in the presence of a fluid zeolite cracking catalyst, the improvement comprising segregating said hydrocarbon feed into relatively low and relatively high molecular weight fractions, charging said fractions to separate cracking zones, the process performed in the separate zones at a temperature between 900° and 1,100° F. and a residence time of less than 5 seconds during which catalyst and hydrocarbon both flow concurrently through the process under conditions such as to avoid formation of a catalyst bed in the reaction flow stream, introducing diluent vapor to the separate zones which reduces the partial pressure of hydrocarbon feed and produces a net increase in debutanized gasoline yield, and recovering debutanized gasoline from the separate zones in an amount including said net increase.

2. The process of claim 1 wherein the space velocity in the separate zones is at least about 100 weight of hydrocarbon feed per hour per weight of catalyst.

3. The process of claim 1 wherein the separate zones the linear velocity is between about 25 and 75 feet per second and the reactor length to diameter ratio is above about 20.

4. The process of claim 1 wherein the catalyst to oil weight ratio entering the separate zones is between about 4:1 and about 15:1 and the catalyst to oil weight ratio at any position along the flow path the separate zones is about the same as the entering ratio.

5. The process of claim 1 wherein the density of the material at the inlet of the separate zones is no more than about 4 pounds per cubic foot.

6. The process of claim 1 wherein said diluent vapor is steam and is present in an amount between about 0.5 to 10 weight percent based on hydrocarbon feed.

7. The process of claim 1 wherein said catalyst is charged at a temperature of at least about 1,240° F.

8. The process of claim 1 wherein the diluent vapor is steam, nitrogen, methane or ethylene.

9. The process of claim 1 wherein the effluent stream discharges from the separate cracking zones in a lateral direction.

10. The process of claim 1 wherein the residence time in the high molecular weight zone is lower than the residence time in the low molecular weight zone.

11. The process of claim 1 wherein the pressure in the separate zones is about 5 to 50 pounds per square inch gauge.

* * * * *

PO-1050
(5/69)

UNITED STATES PATENT OFFICE
CERTIFICATE OF CORRECTION

Patent No. 3,617,496      Dated November 2, 1971

Inventor(s) Millard C. Bryson and James R. Murphy

It is certified that error appears in the above-identified patent and that said Letters Patent are hereby corrected as shown below:

COL. 6, LINE 43, DELETE "1000,000" AND INSERT --100,000-- .

COL. 8, LINE 14, DELETE "1,1100°F." AND INSERT --1,100°F.-- .

COL. 9, LINE 75, DELETE "i-Buyane" AND INSERT --i-Butane-- .

COL. 10, LINE 49, DELETE "72.9" AND INSERT --72.8-- .

COL. 10, LINE 57, DELETE "$C_1$" AND INSERT --$C_3$-- .

COL. 12, LINE 29, DELETE "9." AND INSERT --9.1-- .

COL. 12, LINE 31, DELETE "t" AND INSERT --the-- .

COL. 13, LINE 10, DELETE "cn" AND INSERT --can-- .

Signed and sealed this 18th day of July 1972.

(SEAL)
Attest:

EDWARD M. FLETCHER, JR.      ROBERT GOTTSCHALK
Attesting Officer      Commissioner of Patents